(12) United States Patent
Eckel et al.

(10) Patent No.: US 8,383,709 B2
(45) Date of Patent: Feb. 26, 2013

(54) EASY-FLOWING POLYCARBONATE/ABS MOULDING COMPOSITIONS WITH GOOD MECHANICAL PROPERTIES AND A GOOD SURFACE

(75) Inventors: Thomas Eckel, Dormagen (DE); Burkhard Thuermer, Bornheim (DE); Vera Taschner, Köln (DE); Dieter Wittmann, Leverkusen (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 13/091,729

(22) Filed: Apr. 21, 2011

(65) Prior Publication Data

US 2011/0263766 A1 Oct. 27, 2011

(30) Foreign Application Priority Data

Apr. 23, 2010 (DE) .................. 10 2010 018 234

(51) Int. Cl.
*C08K 5/523* (2006.01)
(52) U.S. Cl. .................. 524/127; 524/140; 524/141
(58) Field of Classification Search .................. 54/117, 54/140, 141; 524/127, 140, 141
See application file for complete search history.

(56) References Cited

U.S. PATENT DOCUMENTS

| | | | |
|---|---|---|---|
| 5,679,759 | A | 10/1997 | Wittmann et al. |
| 6,083,428 | A | 7/2000 | Ueda et al. |
| 6,706,788 | B2 | 3/2004 | Eckel et al. |
| 6,727,301 | B1 | 4/2004 | Eckel et al. |
| 6,753,366 | B1 | 6/2004 | Eckel et al. |
| 2007/0135568 | A1 | 6/2007 | Eckel et al. |
| 2009/0181199 | A1* | 7/2009 | Agarwal et al. .............. 428/36.8 |
| 2009/0214861 | A1 | 8/2009 | Ogawa et al. |

FOREIGN PATENT DOCUMENTS

| | | |
|---|---|---|
| EP | 0 363 608 | 4/1990 |
| EP | 0 704 488 | 4/1996 |
| EP | 0 747 424 | 12/1996 |
| EP | 0 755 977 | 1/1997 |
| EP | 0754 531 | 1/1997 |
| EP | 1 003 809 | 5/2000 |
| EP | 1 165 680 | 1/2002 |
| EP | 0 983 315 | 3/2008 |

OTHER PUBLICATIONS

Notification of Transmittal of the International Search Report and the Written Opinion of the International Searching Authority issued Jul. 8, 2011 in corresponding International Application No. PCT/EP2011/056346.
International Preliminary Report on Patentability for PCT/EP2011/056346 Issued Oct. 22, 2012.

* cited by examiner

*Primary Examiner* — Peter Szekely
(74) *Attorney, Agent, or Firm* — Baker Donelson Bearman Caldwell & Berkowitz, PC

(57) ABSTRACT

The present invention relates to flame-resistant moulding compositions of polycarbonates and graft polymers which, in addition to good flow properties, have very good mechanical properties and a particularly good, trouble-free surface. These moulding compositions are suitable in particular for injection moulding uses for mouldings with thin wall thicknesses and high-gloss surfaces. The thermoplastic moulding compositions according to the invention comprise A) 65.0 to 82.0 parts by wt. of at least one aromatic polycarbonate, B) 4.0 to 11.0 parts by wt. of at least one graft polymer, C) 14.0 to 24.0 parts by wt. of at least one phosphorus-containing flameproofing agent, wherein the sum of the parts by weight of components A to C adds up to 100 parts by weight and the total content of the polymer which is formed from the grafting monomers or is added in the free form and is not bonded chemically to the graft base is less than 2.0 wt. %, based on the total moulding composition.

20 Claims, No Drawings

EASY-FLOWING POLYCARBONATE/ABS MOULDING COMPOSITIONS WITH GOOD MECHANICAL PROPERTIES AND A GOOD SURFACE

CROSS REFERENCE TO RELATED APPLICATIONS

This application claims priority from DE 102010018234.6 filed Apr. 23, 2010, the content of which is incorporated herein by reference in its entirety.

BACKGROUND OF THE INVENTION

1. Field of the Invention

The present invention relates to flame-resistant moulding compositions of polycarbonates and graft polymers which, in addition to good flow properties, have very good mechanical properties and a particularly good, trouble-free surface. These moulding compositions are suitable in particular for injection moulding uses for mouldings with thin wall thicknesses and high-gloss surfaces.

2. Description of Related Art

EP 0 363 608 describes polymer mixtures of aromatic polycarbonate, styrene-containing copolymer or graft copolymer and oligomeric phosphates as flameproofing additives. For certain fields of use, the level of mechanical properties, in particular the weld strength, the flow properties and in particular the surface quality, is not adequate.

EP 0 704 488 describes moulding compositions of aromatic polycarbonate, styrene-containing copolymers and graft polymers with a specific graft base in certain ratios of amounts. These moulding compositions can optionally be rendered flame-resistant with phosphorus compounds. These moulding compositions have very good notched impact strengths, although the flow properties and surface quality are not adequate for certain intended uses.

EP 747 424 describes thermoplastic resins which contain phosphate compounds with a molecular weight of from 500 to 2,000 and phosphate compounds with a molecular weight of from 2,300 to 11,000 as flameproofing agents, a large number of thermoplastic resins being listed. The flow properties of the moulding compositions are impaired significantly by the high molecular weights of the phosphorus compounds.

EP 754 531 describes reinforced PC/ABS moulding compositions which are suitable for precision parts. Inter alia, oligophosphates of the BPA types are also used as flameproofing agents. The high filler contents have a very adverse effect on the mechanical properties and the flow properties.

EP 755 977 describes polymer mixtures of aromatic polycarbonate, graft copolymer with a rubber content of <25% and oligomeric phosphates with a content of <8%. Due to the limited flameproofing agent content, the flow properties and the flame resistance are not adequate. Moreover, there are no indications of the desired good surface quality.

EP 1 003 809 describes PC/ABS moulding compositions which contain oligomeric phosphorus compounds and graft polymers of a graft base with a certain particle size. These moulding compositions are distinguished by good mechanical properties, in particular also under increased elasticity stress. However, their flow properties, their flame resistance and their surface quality are not adequate for certain fields of use.

EP 0 983 315 describes moulding compositions of aromatic polycarbonate, graft polymer and a flameproofing agent combination of a monomeric and an oligomeric phosphorus compound. These moulding compositions have a high heat distortion temperature and excellent mechanical properties (notched impact strength and weld line strength), although the flow properties and the flame resistance, in particular in shaped articles with thin wall thicknesses, is not adequate.

EP 1 165 680 describes flame-resistant PC/ABS moulding compositions with good mechanical properties (tensile strength, weld line strength), which contain oligomeric phosphates with a defined chain length. The ranges of amounts chosen for flameproofing agents and graft polymer are very wide. The property combination according to the invention of flow properties, good mechanical properties and good surface quality is therefore not described.

SUMMARY OF THE INVENTION

An object of the present invention was to provide polycarbonate moulding compositions which, in addition to good flow properties, have very good mechanical properties, in particular notched impact strength and weld line strength, and a particularly good, trouble-free surface. The moulding compositions should moreover have a good flame resistance, including at low wall thicknesses (<1.5 mm).

It has now been found, surprisingly, that the abovementioned properties can be obtained in some embodiments if a particularly efficient graft polymer is employed in combination with the lowest possible content of free polymer of the monomers of the grafted-on shell, such as, for example, SAN. The contents here of graft polymer and flameproofing agent preferably lie within a selected range in order to obtain an optimum combination of flow properties and mechanical properties, while the content of free polymer of the monomers of the grafted-on shell preferably does not exceed 2.0 wt. %, more preferably 1.5 wt. %, in the total composition. The moulding compositions composed in this way in many embodiments are distinguished by improved mechanical properties, such as high notched impact strength, in combination with high weld line strength and optimized surface cosmetics. Due to the high content of flameproofing agent, the PC/ABS mixtures have excellent flame resistances and particularly good flow properties.

The present invention provides flame-resistant, thermoplastic moulding compositions comprising A) 65.0 to 82.0 parts by wt., preferably 70.0 to 80.0 parts by wt., particularly preferably 73.0 to 78.0 parts by wt. of at least one aromatic polycarbonate, B) 4.0 to 11.0 parts by wt., preferably 5.0 to 10.0 parts by wt., particularly preferably 5.0 to 9.0 parts by wt. of at least one graft polymer, C) 14.0 to 24.0 parts by wt., preferably 15.0 to 20.0 parts by wt., particularly preferably 15.0 to 18.0 parts by wt. of at least one phosphorus-containing flameproofing agent, wherein the sum of the parts by weight of components A to C adds up to 100 parts by weight.

DETAILED DESCRIPTION OF A PREFERRED EMBODIMENT

Further additives D) can optionally be present, if included, preferably in a content of 0.05-15.00 parts by wt., more preferably 0.2-10.0 parts by wt., particularly preferably 0.4-5.0 parts by wt.

Particularly preferred moulding compositions contain as component D), in addition to optional further additives, a fluorinated polyolefin in an amount of 0.05 to 5.0 parts by wt., preferably 0.1 to 2.0 parts by wt., particularly preferably 0.1 to 1.0 parts by wt.

Particularly preferred moulding compositions contain as component D), in addition to optional further additives, a mould release agent, e.g. pentaerythritol tetrastearate, in an amount of 0.1 to 1.5 parts by wt., preferably 0.2 to 1.0 parts by wt., particularly preferably 0.3 to 0.8 part by wt.

Particularly preferred moulding compositions contain as component D), in addition to optional further additives, at least one stabilizer, for example chosen from the group of sterically hindered phenols, phosphites and mixtures thereof, and particularly preferably Irganox® B900, in an amount of 0.01 to 0.4 part by wt., preferably 0.03 to 0.3 part by wt., particularly preferably 0.06 to 0.2 part by wt.

Component A

Aromatic polycarbonates and/or aromatic polyester carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3,007,934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

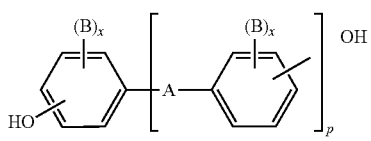

(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing hetero atoms can be fused, or a radical of the formula (II) or (III)

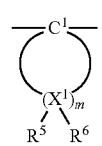

(II)

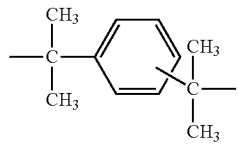

(III)

B is in each case $C_1$ to $C_{12}$-alkyl, preferably methyl, halogen, preferably chlorine and/or bromine, x is in each case independently of each other 0, 1 or 2, P is 1 or 0, and $R^5$ and $R^6$ can be chosen individually for each $X^1$ and independently of each other denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol-A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxy-phenyl)-propane, 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates have average weight-average molecular weights ($M_w$, measured by GPC (gel permeation chromatography) with a polycarbonate standard) of from 10,000 to 200,000 g/mol, preferably 15,000 to 80,000 g/mol, particularly preferably 24,000 to 32,000 g/mol.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups. Preferably, linear polycarbonates, more preferably based on bisphenol A, are employed. Both homopolycarbonates and copolycarbonates are suitable. 1 to 25 wt. %, preferably 2.5 to 25 wt. %, based on the total amount of diphenols to be employed, of polydiorganosiloxanes with hydroxyaryloxy end groups can also be employed for the preparation of the copolycarbonates according to the invention according to component A. These are known (U.S. Pat. No. 3,419,634) and can be prepared by processes known from the literature. Copolycarbonates containing polydiorganosiloxane are likewise suitable; the preparation of copolycarbonates containing polydiorganosiloxane is described, for example, in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by $C_1$ to $C_{22}$-alkyl groups or by halogen atoms, and aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

One or more aromatic hydroxycarboxylic acids can additionally be employed in the preparation of aromatic polyester carbonates.

The aromatic polyester carbonates can be either linear or branched in a known manner (in this context see DE-A 2 940 024 and DE-A 3 007 934), linear polyester carbonates being preferred.

Branching agents which can be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxy-phenyl-isopropyl]-phenoxy)-methane, 1,4-bis[4,4'-dihydroxytriphenyl]-methyl]-benzene, in amounts of from 0.01 to 1.0 mol %, based on the diphenols employed. Phenolic branching agents can be initially introduced with the diphenols; acid chloride branching agents can be introduced together with the acid dichlorides.

The content of carbonate structural units in the thermoplastic aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The thermoplastic aromatic polycarbonates and polyester carbonates can be employed by themselves or in any desired mixture.

Component B

The graft polymers B include e.g. graft polymers with rubber-elastic properties, which are essentially obtainable from at least 2 of the following monomers: chloroprene, buta-1,3-diene, isoprene, styrene, acrylonitrile, ethylene, propylene, vinyl acetate and (meth)acrylic acid esters having 1 to 18 C atoms in the alcohol component; that is to say polymers such as are described e.g. in "Methoden der Organischen Chemie" (Houben-Weyl), vol. 14/1, Georg Thieme-Verlag, Stuttgart 1961, p. 393-406 and in C. B. Bucknall, "Toughened Plastics", Appl. Science Publishers, London 1977. Preferred polymers B are partly crosslinked and have gel contents (measured in toluene) of more than 20 wt. %, preferably more than 40 wt. %, in particular more than 60 wt. %.

The gel content is determined at 25° C. in a suitable solvent (M. Hoffmann, H. Kromer, R. Kuhn, Polymeranalytik I and II, Georg Thieme-Verlag, Stuttgart 1977).

Preferred graft polymers B include graft polymers of:
B.1) 5 to 95, preferably 30 to 80 parts by wt. of a mixture of
B.1.1) 50 to 95 parts by wt. of styrene, α-methylstyrene, styrene substituted on the nucleus by methyl, $C_1$-$C_8$-alkyl methacrylate, in particular methyl methacrylate, $C_1$-$C_8$-alkyl acrylate, in particular methyl acrylate, or mixtures of these compounds and
B.1.2) 5 to 50 parts by wt. of acrylonitrile, methacrylonitrile, $C_1$-$C_8$-alkyl methacrylates, in particular methyl methacrylate, $C_1$-$C_8$-alkyl acrylate, in particular methyl acrylate, maleic anhydride, maleimides N-substituted by $C_1$-$C_4$-alkyl or phenyl or mixtures of these compounds on
B.2) 5 to 95, preferably 20 to 70 parts by wt. of a rubber-containing graft base.

Preferably, the graft base has a glass transition temperature below −10° C.

A graft base based on a polybutadiene rubber is particularly preferred.

The glass transition temperature is determined by means of dynamic differential thermoanalysis (DSC) in accordance with the standard DIN EN 61006 at a heating rate of 10 K/min with definition of the $T_g$ as the midpoint temperature (tangent method)

Preferred graft polymers B are e.g. polybutadienes, butadiene/styrene copolymers and acrylate rubbers grafted with styrene and/or acrylonitrile and/or (meth)acrylic acid alkyl esters; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with acrylic or methacrylic acid alkyl esters, vinyl acetate, acrylonitrile, styrene and/or alkylstyrenes, such as are described e.g. in DE-OS 2 348 377 (=U.S. Pat. No. 3,919,353).

Particularly preferred graft polymers B are graft polymers which are obtainable by a grafting reaction of
I. 10 to 70, preferably 15 to 50, in particular 20 to 40 wt. %, based on the graft product, of at least one (meth)acrylic acid ester or 10 to 70, preferably 15 to 50, in particular 20 to 40 wt. % of a mixture of 10 to 50, preferably 20 to 35 wt. %, based on the mixture, of acrylonitrile or (meth)acrylic acid ester and 50 to 90, preferably 65 to 80 wt. %, based on the mixture, of styrene on II. 30 to 90, preferably 40 to 85, in particular 50 to 80 wt. %, based on the graft product, of a butadiene polymer with at least 50 wt. %, based on II, of butadiene radicals as the graft base.

The gel content of this graft base II is preferably at least 70 wt. % (measured in toluene), the degree of grafting G is 0.15 to 0.55 and the average particle diameter $d_{50}$ of the graft polymer B is 0.05 to 2, preferably 0.1 to 0.6 µm.

(Meth)acrylic acid esters I are esters of acrylic acid or methacrylic acid and monohydric alcohols having 1 to 18 C atoms. Methacrylic acid methyl ester, ethyl ester and propyl ester are particularly preferred.

The graft base II can contain, in addition to butadiene radicals, up to 50 wt. %, based on II, of radicals of other ethylenically unsaturated monomers, such as styrene, acrylonitrile, esters of acrylic or methacrylic acid having 1 to 4 C atoms in the alcohol component (such as methyl acrylate, ethyl acrylate, methyl methacrylate, ethyl methacrylate), vinyl esters and/or vinyl ethers. The preferred graft base II preferably comprises pure polybutadiene.

Since as is known the grafting monomers are not necessarily grafted completely on to the graft base during the grafting reaction, according to the invention graft polymers B are also understood as meaning those products which are obtained by polymerization of the grafting monomers in the presence of the graft base.

The moulding compositions according to the invention have a total content of the polymer which is formed from the grafting monomers or is added in the free form and is not bonded chemically to the graft base, e.g. free SAN, of less than 2.0 wt. %, preferably less than 1.5 wt. % (i.e. of 0.0-2.0 wt. %, preferably 0.0-1.5 wt. %), based on the total moulding composition. If this content increases, the properties according to the invention deteriorate drastically.

In one embodiment, free SAN can be less than 2.0 wt. %, preferably less than 1.5 wt. % (i.e. of 0.0-2.0 wt. %, preferably 0.0-1.5 wt. %), based on the total weight of the moulding composition.

The degree of grafting G describes the weight ratio of grafted-on grafting monomers to the graft base and is dimensionless.

The average particle size $d_{50}$ is the diameter above and below which in each case 50 wt. % of the particles lie. It can be determined by means of ultracentrifuge measurements (W. Scholtan, H. Lange, Kolloid, Z. and Z. Polymere 250 (1972), 782-796).

Further preferred graft polymers B are e.g. also graft polymers of
(a) 20 to 90 wt. %, based on B, of acrylate rubber as the graft base and
(b) 10 to 80 wt. %, based on B, of at least one polymerizable, ethylenically unsaturated monomer, homo- or copolymers of which formed in the absence of a) would have a glass transition temperature above 25° C., as grafting monomers.

The graft base of acrylate rubber has a glass transition temperature of below −20° C., preferably below −30° C.

The acrylate rubbers (a) of the polymers B. are preferably polymers of acrylic acid alkyl esters, optionally with up to 40 wt. %, based on (a), of other polymerizable, ethylenically unsaturated monomers. The preferred polymerizable acrylic acid esters include $C_1$-$C_8$-alkyl esters, for example methyl, ethyl, n-butyl, n-octyl and 2-ethylhexyl esters, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms, such as e.g. ethylene glycol dimethacrylate, allyl methacrylate; polyunsaturated heterocyclic compounds, such as e.g. trivinyl and triallyl cyanurate; polyfunctional vinyl compounds, such as di- and trivinylbenzenes; but also triallyl phosphate and diallyl phthalate.

Preferred crosslinking monomers are allyl methacrylate, ethylene glycol dimethacrylate, diallyl phthalate and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine and triallylbenzenes.

The amount of the crosslinking monomers is preferably 0.02 to 5, in particular 0.05 to 2 wt. %, based on the graft base (a).

In the case of cyclic crosslinking monomers having at least 3 ethylenically unsaturated groups, it is advantageous to limit the amount to less than 1 wt. % of the graft base (a).

Preferred "other" polymerizable, ethylenically unsaturated monomers which can optionally serve for preparation of the graft base (a) in addition to the acrylic acid esters are e.g. acrylonitrile, styrene, a-methylstyrene, acrylamides, vinyl $C_1$-$C_6$-alkyl ethers, methyl methacrylate, butadiene. Preferred acrylate rubbers as the graft base (a) are emulsion polymers which have a gel content of at least 60 wt. %.

Further suitable graft bases are silicone rubbers with grafting-active sites and a gel content of at least 40% (measured in dimethylformamide), such as are described in the Offenlegungsschriften DE 37 04 657, DE 37 04 655, DE 36 31 540 and DE 36 31 539.

Component C

Phosphorus-containing flameproofing agents C in the context according to the invention are preferably chosen from the groups of mono- and oligomeric phosphoric and phosphonic acid esters, phosphonatamines and phosphazenes, it also being possible to employ mixtures of several components chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (V)

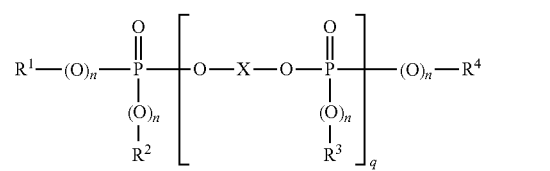

wherein

R¹, R², R³ and R⁴ independently of each other denote in each case optionally halogenated C1 to C8-alkyl, or C5 to C6-cycloalkyl, $C_6$ to $C_{20}$-aryl or $C_7$ to $C_{12}$-aralkyl in each case optionally substituted by alkyl, preferably C1 to C4-alkyl, and/or halogen, preferably chlorine, bromine,

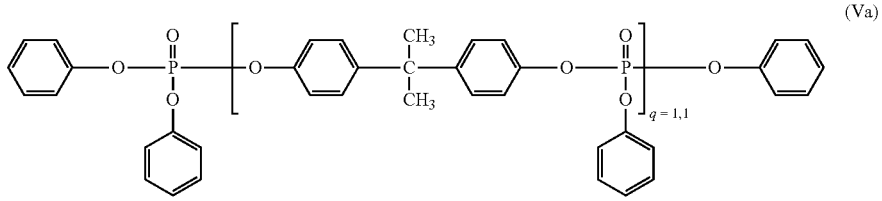

(Va)

n independently of each other denote 0 or 1, q denotes 0 to 30 and

X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, R¹, R², R³ and R⁴ independently of each other represent C1 to C4-alkyl, phenyl, naphthyl or phenyl-$C_1$-$C_4$-alkyl. The aromatic groups R¹, R², R³ and R⁴ can in their turn be substituted by halogen groups and/or alkyl groups, preferably chorine, bromine and/or C1 to C4-alkyl. Particularly preferred aryl radicals are cresyl, phenyl, xylenyl, propylphenyl or butylphenyl and the corresponding brominated and chlorinated derivatives thereof.

X in the formula (V) preferably denotes a mono- or polynuclear aromatic radical having 6 to 30 C atoms. This is preferably derived from diphenols of the formula (I).

n in the formula (V) can be, independently of each other, 0 or 1, and preferably n is 1.

q represent integral values from 0 to 30, preferably 0 to 20, particularly preferably 0 to 10, in the case of mixtures average values from 0.8 to 5.0, preferably 1.0 to 3.0, more preferably 1.05 to 2.00 and particularly preferably from 1.08 to 1.60.

X particularly preferably represents

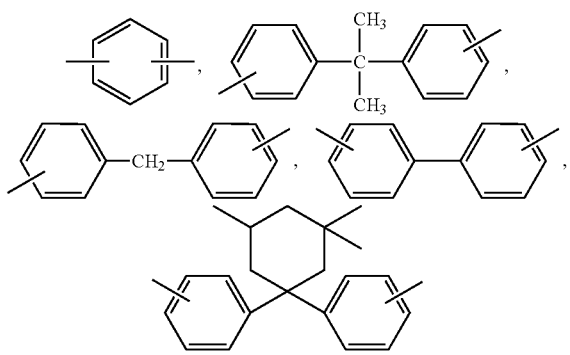

or chlorinated or brominated derivatives thereof, and in particular X is derived from resorcinol, hydroquinone, bisphenol A or diphenylphenol. Particularly preferably, X is derived from bisphenol A.

Phosphorus compounds of the formula (V) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, resorcinol-bridged oligophosphate and bisphenol A-bridged oligophosphate. The use of oligomeric phosphoric acid esters of the formula (V) which are derived from bisphenol A is particularly preferred.

Bisphenol A-based oligophosphate according to formula (Va)

is most preferred as component C.

The phosphorus compounds according to component C are known (cf. e.g. EP-A 0 363 608, EP-A 0 640 655) or can be prepared by known methods in an analogous manner (e g Ullmanns Enzyklopadie der technischen Chemie, vol. 18, p. 301 et seq. 1979; Houben-Weyl, Methoden der organischen Chemie, vol. 12/1, p. 43; Beilstein vol. 6, p. 177).

Mixtures of phosphates of different chemical structure and/or of the same chemical structure and different molecular weight can also be employed as component C according to the invention.

Preferably, mixtures of the same structure and different chain length are used, the q value stated being the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO 00/00541 and WO 01/18105 can furthermore be employed as flameproofing agents.

The flameproofing agents can be employed by themselves or in any desired mixture with one another or in a mixture with other flameproofing agents.

Further Additives D

The composition can comprise further conventional polymer additives, such as flameproofing synergists, antidripping agents (for example compounds of the substance classes of fluorinated polyolefins, of silicones and aramid fibres), lubricants and mould release agents (for example pentaerythritol tetrastearate), nucleating agents, stabilizers, antistatics (for example conductive carbon blacks, carbon fibres, carbon nanotubes and organic antistatics, such as polyalkylene ethers, alkylsulfonates or polyamide-containing polymers) and dyestuffs, pigments, fillers and reinforcing substances, in particular glass fibres, mineral reinforcing substances and carbon fibres.

In particular, polytetrafluoroethylene (PTFE) or PTFE-containing compositions, such as, for example, masterbatches of PTFE with polymers or copolymers containing styrene or methyl methacrylate, as a powder or as a coagulated mixture, e.g. with component B, are employed as antidripping agents.

The fluorinated polyolefins employed as antidripping agents are of high molecular weight and have glass transition temperatures of above −30° C., as a rule of above 100° C., fluorine contents preferably of from 65 to 76, in particular from 70 to 76 wt. %, average particles diameters $d_{50}$ of from 0.05 to 1,000, preferably 0.08 to 20 µm. In general, the fluorinated polyolefins have a density of from 1.2 to 2.3 g/cm³. Preferred fluorinated polyolefins are polytetrafluoroethylene, polyvinylidene fluoride, tetrafluoroethylene/hexafluoropropylene copolymers and ethylene/tetrafluoroethylene copolymers. The fluorinated polyolefins are known (cf. "Vinyl and Related Polymers" by Schildknecht, John Wiley & Sons, Inc., New York, 1962, page 484-494; "Fluorpolymers" by Wall, Wiley-Interscience, John Wiley & Sons, Inc., New York, volume 13, 1970, page 623-654; "Modern Plastics Encyclopedia", 1970-1971, volume 47, no. 10 A, October 1970, Mc Graw-Hill, Inc., New York, page 134 and 774; "Modern Plastics Encyclopedia", 1975-1976, October 1975, volume 52, no. 10 A, Mc Graw-Hill, Inc., New York, page 27, 28 and 472 and U.S. Pat. Nos. 3,671,487, 3,723,373 and 3 838 092).

They can be prepared by known processes, thus, for example, by polymerization of tetrafluoroethylene in aqueous medium using a catalyst which forms free radicals, for example sodium, potassium or ammonium peroxydisulfate, under pressures of from 7 to 71 kg/cm² and at temperatures of from 0 to 200° C., preferably at temperatures of from 20 to 100° C. (For further details see e.g. U.S. Pat. No. 2,393,967). Depending on the use form, the density of these materials can be between 1.2 and 2.3 g/cm³, and the average particle size can be between 0.05 and 1,000 µm.

The fluorinated polyolefins which are preferred according to the invention have average particle diameters of from 0.05 to 20 µm, preferably 0.08 to 10 µm, and a density of from 1.2 to 1.9 g/cm³.

Suitable fluorinated polyolefins D which can be employed in powder form are tetrafluoroethylene polymers with an average particle diameter of from 100 to 1,000 µm and densities of from 2.0 g/cm³ to 2.3 g/cm³. Suitable tetrafluoroethylene polymer powders are commercially obtainable products and are available, for example, from DuPont under the trade name Teflon®.

Sterically hindered phenols and phosphites or mixtures thereof, such as, for example, Irganox© B900 (BASF), are preferably used as stabilizers according to component D. Pentaerythritol tetrastearate is preferably used as a mould release agent.

The moulding compositions according to the invention can additionally contain as additive D, optionally in combination with other additives D, 0.5 to 13.0, preferably 1.0 to 10.0 wt. % of fillers and/or reinforcing substances. Preferred reinforcing substances are glass fibres. Preferred fillers, which can also have a reinforcing action, are glass beads, mica, silicates, quartz, talc, titanium dioxide, wollastonite.

The moulding compositions according to the invention comprising components A to C and optionally further known additions D, such as stabilizers, dyestuffs, pigments, lubricants and mould release agents, fillers and reinforcing substances, nucleating agents and antistatics, are prepared by mixing the particular constituents in a known manner and subjecting the mixture to melt compounding or melt extrusion at temperatures of from 200° C. to 330° C. in conventional units, such as internal kneaders, extruders and twin-screw extruders.

The present invention therefore also provides a process for the preparation of thermoplastic moulding compositions containing components A to C and optionally additives D, which are subjected to melt compounding or melt extrusion at temperatures of from 200 to 330° C., preferably from 220 to 200° C. in conventional units after mixing has taken place.

The mixing of the individual constituents can be carried out in a known manner either successively or simultaneously, and in particular either at about 20° C. (room temperature) or at a higher temperature.

The moulding compositions of the present invention can be used for the production of all types of shaped articles. In particular, shaped articles can be produced by injection moulding. Examples of shaped articles which can be produced include, for example: housing parts of any type, e.g. for domestic appliances, such as TV and HiFi equipment, coffee machines, mixers, office machines, such as monitors or printers, or cover sheets for the construction sector and parts for the motor vehicle sector. They are moreover employed in the field of electrical engineering, because they have very good electrical properties.

The moulding compositions are particularly suitable for the production of thin-walled mouldings (e.g. data technology housing parts, TV housings), where particularly high demands are made on the notched impact strength, flow line strength, flame resistance and surface quality of the plastics employed.

A further form of processing is the production of shaped articles by blow moulding or by thermoforming from previously produced sheets or films.

Preparation and Testing of the Moulding Compositions

The starting substances listed in Table 1 are compounded and granulated on a twin-screw extruder (ZSK-25) (Werner and Pfleiderer) at a speed of rotation of 225 rpm and a throughput of 20 kg/h at a machine temperature of 260° C. The finished granules are processed on an injection moulding machine to give the corresponding test specimens (melt temperature 240° C., mould temperature 80° C., melt front speed 240 mm/s).

The following methods were used for characterization of the properties of the test specimens:

The flowability was determined in accordance with ISO 11443 (melt viscosity). The weld strength anF was measured in accordance with ISO 179/leU on a test bar of dimensions 80×10×4 mm injection moulded on both sides.

The notched impact strength ak was measured in accordance with ISO 180/1A on a test bar of dimensions 80×10×4 mm injection moulded on one side.

The heat distortion temperature was measured in accordance with DIN ISO 306 (Vicat softening temperature, method B with a 50 N load and a heating rate of 120 K/h) on a test bar of dimensions 80×10×4 mm injection moulded on one side.

The melt flowability (MVR) is evaluated with the aid of the melt volume flow rate (MVR) measured in accordance with ISO 1133 at a temperature of 240° C. and with a plunger load of 5 kg.

The burning properties are measured in accordance with UL 94V on bars of dimensions 127×12.7 x 1.0 mm.

The following examples serve to explain the invention further.

EXAMPLES

Component A

Linear polycarbonate based on bisphenol A having a weight-average molecular weight $\overline{M}_w$ of 27,500 g/mol (determined by GPC in methylene chloride with polycarbonate as the standard).

Component B1

ABS polymer prepared by emulsion polymerization of 43 wt. % (based on the ABS polymer) of a mixture of 27 wt. % of acrylonitrile and 73 wt. % of styrene in the presence of 57 wt. % (based on the ABS polymer) of a particulate crosslinked polybutadiene rubber (average particle diameter $d_{50}$=0.35 µm), the graft polymer containing approx. 15% of free, soluble SAN. The gel content is 72%. Component B2

Copolymer of 77 wt. % of styrene and 23 wt. % of acrylonitrile having a weight-average molecular weight $M_w$ of 130,000 g/mol (determined by GPC in tetrahydrofuran with a polystyrene standard), prepared by the bulk process.

Component C

Oligophosphate based on bisphenol A

Component D

D1: Polytetrafluoroethylene powder, CFP 6000 N, Du Pont.
D2: Pentaerythritol tetrastearate as a lubricant/mould release agent
D3: Phosphite stabilizer, Irganox® B900 (mixture of 80% Irgafos® 168 and 20% Irganox® 1076; BASF AG; Ludwigshafen/Irgafos® 168 (tris(2,4-di-tert-butyl-phenyl) phosphite)/Irganox® 1076 (2,6-di-tert-butyl-4-(octadecanoxycarbonylethyl)phenol)

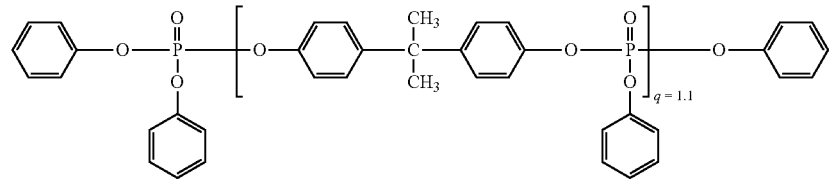

TABLE 1

Experimental data

| Component | wt. % | 1 (Comp.) | 2 | 3 | 4 | 5 | 6 | 7 | 8 (Comp.) |
|---|---|---|---|---|---|---|---|---|---|
| A | | 79.10 | 78.10 | 77.10 | 76.10 | 75.10 | 74.10 | 73.10 | 74.10 |
| B1 | | 7.00 | 7.00 | 7.00 | 7.00 | 7.00 | 7.00 | 7.00 | 7.00 |
| B2 | | | | | | | | | 1.00 |
| C | | 13.00 | 14.00 | 15.00 | 16.00 | 17.00 | 18.00 | 19.00 | 17.00 |
| D1 | | 0.40 | 0.40 | 0.40 | 0.40 | 0.40 | 0.40 | 0.40 | 0.40 |
| D2 | | 0.40 | 0.40 | 0.40 | 0.40 | 0.40 | 0.40 | 0.40 | 0.40 |
| D3 | | 0.10 | 0.10 | 0.10 | 0.10 | 0.10 | 0.10 | 0.10 | 0.10 |
| Total | | 100.00 | 100.00 | 100.00 | 100.00 | 100.00 | 100.00 | 100.00 | 100.00 |
| Properties | Units | | | | | | | | |
| ak ISO 180/1A | [kJ/m²] | 47.5 | 43.9 | 40.8 | 39.2 | 37.5 | 32.5 | 17.5 | 34.2 |
| Vicat B 120 | [° C.] | 106 | 103 | 99 | 96 | 93 | 90 | 87 | 93 |
| UL 94 V/1.0 mm | | V-1 | V-1 | V-0 | V-0 | V-0 | V-0 | V-0 | V-0 |
| After-burn time | [s] | 68 | 51 | 33 | 25 | 18 | 12 | 9 | 25 |
| MVR 240/5 kg | [ccm/10 min] | 15.7 | 17.3 | 19.5 | 22.0 | 25.0 | 28.1 | 31.4 | 25.9 |
| Melt viscosity 260° C./1,000s-1 | [Pas] | 235 | 221 | 209 | 197 | 185 | 167 | 151 | 179 |
| anF weld | [kJ/m²] | 55.5 | 54.8 | 54.1 | 53.7 | 52.3 | 49.5 | 46.0 | 35.6 |

| Component | wt. % | 9 (Comp.) | 10 | 11 | 12 | 13 | 14 | 15 |
|---|---|---|---|---|---|---|---|---|
| A | | 73.10 | 76.10 | 77.10 | 78.10 | 74.10 | 73.10 | 72.10 |
| B1 | | 7.00 | 6.00 | 5.00 | 4.00 | 8.00 | 9.00 | 10.00 |
| B2 | | 2.00 | | | | | | |
| C | | 17.00 | 17.00 | 17.00 | 17.00 | 17.00 | 17.00 | 17.00 |
| D1 | | 0.40 | 0.40 | 0.40 | 0.40 | 0.40 | 0.40 | 0.40 |
| D2 | | 0.40 | 0.40 | 0.40 | 0.40 | 0.40 | 0.40 | 0.40 |
| D3 | | 0.10 | 0.10 | 0.10 | 0.10 | 0.10 | 0.10 | 0.10 |
| Total | | 100.00 | 100.00 | 100.00 | 100.00 | 100.00 | 100.00 | 100.00 |
| Properties | Units | | | | | | | |
| ak ISO 180/1A | [kJ/m²] | 26.9 | 31.5 | 24.1 | 13.2 | 39.5 | 42.2 | 45.8 |
| Vicat B 120 | [° C.] | 92 | 93 | 93 | 94 | 92 | 91 | 90 |
| UL 94 V/1.0 mm | | V-0 | V-0 | V-0 | V-0 | V-0 | V-0 | V-1 |
| After-burn time | [s] | 32 | 14 | 10 | 7 | 25 | 33 | 53 |
| MVR 240/5 kg | [ccm/10 min] | 27.1 | 25.3 | 25.5 | 25.6 | 24.8 | 24.1 | 22.9 |
| Melt viscosity 260° C./1,000s-1 | [Pas] | 167 | 187 | 188 | 190 | 182 | 177 | 169 |
| anF weld | [kJ/m²] | 21.0 | 53.1 | 53.8 | 54.1 | 49.7 | 47.8 | 43.1 |

The moulding compositions according to the invention show a very advantageous combination of properties of good flow properties, good mechanical properties, in particular the notched impact strength and weld line strength, and a particularly good trouble-free surface, the moulding compositions having a good flame resistance, including at low wall thicknesses (<1.5 mm, measured at 1.0 mm) As can be deduced from Table 1, comparative example 1 which does not include at least 14% of component C has reduced properties in terms of flame proofing performance and flowability, while comparative examples 8 and 9 which include acrylonitrile copolymerized therein in an amount of 1 and 2% respectively, have decreased desired properties in terms of weld line strength being 35.6 and 21.0 compared to values of at least 43 with acrylonitrile absent. Suitable ranges for various properties desired in the present invention can be described as follows.

Advantageously, a moulding of the present invention exhibits the following properties:
(i) weldline strength of at least 43 kJ/m², and
(ii) a Vicat temperature of 87 to 125° C., and
(iii) melt viscosity (260° C./1,000s$^{-1}$) of 151 to 221.

To with, an addition or the presence of free styrene/acrylonitrile copolymers already leads from a content of 2 wt. % to a significant drop in the weld line strength and the notched impact strength, while the content of flameproofing agent outside the limits according to the invention may have an adverse effect on flame resistance, after-burn time or flow properties. Thus, it is clear that the amount of polymer which is formed from grafting monomers or is added in free form and is not bonded chemically to the graft base is advantageously maintained at a level which is less than about 2% or less than 2%, or advantageously, less than about 1.5% or less than 1.5%, or even less than about 1% or less than 1%.

All documents referred to herein are incorporated herein by reference in their entireties.

As used herein, terms designating singular such as "an", "the", "an" can connote the singular or plural.

The invention claimed is:

1. A flame-resistant, thermoplastic moulding composition comprising
   A) 65.0 to 82.0 parts by wt. of at least one aromatic polycarbonate,
   B) 4.0 to 11.0 parts by wt. of at least one graft polymer of
      B.1) 5 to 95 parts by weight of a mixture of
         B.1.1) 50 to 95 parts by wt. of styrene, α-methylstyrene, styrene substituted on the nucleus by methyl, $C_1$-$C_8$-alkyl methacrylate, $C_1$-$C_8$-alkyl acrylate, or a mixture of these compounds and
         B.1.2) 5 to 50 parts by wt. of acrylonitrile, methacrylonitrile, $C_1$-$C_8$-alkyl methacrylates, $C_1$-$C_8$-alkyl acrylate, maleic anhydride, maleimides N-substituted by $C_1$-$C_4$-alkyl or phenyl or a mixture of these compounds on
      B.2) 5 to 95 parts by wt. of a rubber-containing graft base,
   C) 14.0 to 24.0 parts by wt. of at least one phosphorus-containing flameproofing agent, wherein the sum of the parts by weight of components A to C adds up to 100 parts by weight and wherein the total content of the polymer which is formed from grafting monomers or is added in free form and is not bonded chemically to the graft base is less than 2.0 wt. %, based on the total moulding composition.

2. A moulding composition composition according to claim 1, wherein component
   B) is present in an amount of from 5.0 to 10.0 parts by wt., and component
   C) is present in an amount of from 15.0 to 20.0 parts by wt.

3. A moulding composition composition according to claim 1, wherein component
   B) is present in an amount of from 5.0 to 9.0 parts by wt., and component
   C) is present in an amount of from 15.0 to 18.0 parts by wt.

4. A moulding composition according to claim 1, comprising as rubbers of the graft base B.2 diene rubbers, acrylate rubbers, silicone rubbers or ethylene/propylene/diene rubbers.

5. A moulding composition according to claim 1, wherein the at least one phosphorus-containing flameproofing agent (C) is the compound of formula (V)

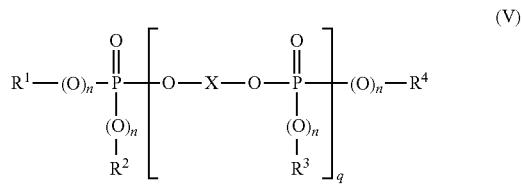

wherein
$R^1$, $R^2$, $R^3$ and $R^4$ independently of each other denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, and/or halogen,
n independently of each other denote 0 or 1
q denotes 0.80 to 5.00 and
X denotes a mono- or polynuclear aromatic radical having 6 to 30 C atoms, or a linear or branched aliphatic radical having 2 to 30 C atoms, which can be substituted by OH and can contain up to 8 ether bonds.

6. A moulding composition according to claim 5, wherein X in the flameproofing agent is selected from the group consisting of phenyl, biphenylene and bisphenylisopropylidene.

7. A moulding composition according to claim 1, wherein the total content of the polymer which is formed from grafting monomers or is added in free form and is not bonded chemically to the graft base is less than 1.5 wt. %, based on the total moulding composition.

8. A moulding M ulding composition according to claim 1, additionally comprising at least one additive (D) selected from the group consisting of flameproofing synergists, antidripping agents, lubricants and mould release agents, nucleating agents, stabilizers, antistatics, dyestuffs, pigments, fillers and reinforcing substances.

9. A moulding composition according to claim 8, wherein the additive D) is present in a content of 0.05 - 15.00 parts by wt.

10. A moulding composition according to claim 9, wherein component D) comprises at least one fluorinated polyolefin in an amount of 0.1 to 1.0 part by wt., based on the total weight of the moulding composition.

11. A moulding composition according to claim 9, wherein component D) comprises at least one mould release agent in an amount of 0.3 to 0.8 part by wt., based on the total weight of the moulding composition.

12. A moulding composition according to claim 9, wherein component D) comprises at least one stabilizer in an amount of 0.06 to 0.2 part by wt., based on the total weight of the moulding composition, the stabilizer being selected from the group consisting of sterically hindered phenols and phosphites and mixtures thereof.

13. A method for the production of shaped articles comprising forming said shaped article from a moulding composition of claim 1.

14. A shaped article produced from a moulding composition according to claim 1.

15. A process for the preparation of a thermoplastic moulding composition of claim 1 comprising mixing components A to C and subjecting components A to C to melt compounding or melt extrusion at a temperature of from 200 to 330° C. after said mixing.

16. A flame-resistant, thermoplastic moulding composition comprising
- A) 65.0 to 82.0 parts by wt. of at least one aromatic polycarbonate;
- B) 5.0 to 9.0 parts by wt. of at least one graft polymer; and
- C) 14.0 to 24.0 parts by wt. of at least one phosphorus-containing flameproofing agent of formula (V):

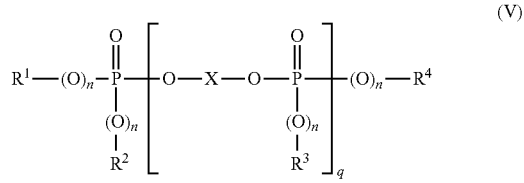

(V)

wherein $R^1$, $R^2$, $R^3$ and $R^4$ independently of each other denote in each case optionally halogenated $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, and/or halogen, n independently of each other denote 0 or 1 q denotes 0.80 to 5.00 and

X denotes a mono- or polynuclear aromatic radical having 6 to 30 C atoms, or a linear or branched aliphatic radical having 2 to 30 C atoms, which can be substituted by OH and can contain up to 8 ether bonds;

wherein the sum of the parts by weight of components A to C adds up to 100 parts by weight and wherein the total content of the polymer which is formed from grafting monomers or is added in free form and is not bonded chemically to the graft base is less than 2.0 wt. %, based on the total moulding composition.

17. The thermoplastic moulding composition of claim 1, having:
- (i) weldline strength of at least 43 kJ/m$^2$;
- (ii) Vicat temperature of about 87° C. to about 125° C.; and
- (iii) melt viscosity (260° C./1,000s$^{-1}$) of about 151 to about 221.

18. The thermoplastic moulding composition of claim 16, having:
- (i) weldline strength of at least 43 kJ/m$^2$;
- (ii) Vicat temperature of about 87° C. to about 125° C.; and
- (iii) melt viscosity (260° C./1,000s$^{-1}$) of about 151 to about 221.

19. A moulding composition according to claim 1, wherein the total content of the polymer which is formed from grafting monomers or is added in free form and is not bonded chemically to the graft base is less than 1.5 wt. %, based on the total moulding composition.

20. A moulding composition according to claim 16, wherein the total content of the polymer which is formed from grafting monomers or is added in free form and is not bonded chemically to the graft base is less than 1.5 wt. %, based on the total moulding composition.

* * * * *